(No Model.)

J. S. GARNER.
LOCK FOR BICYCLES.

No. 601,464. Patented Mar. 29, 1898.

WITNESSES:
C. Nordfors
C. Gerst

INVENTOR
John S. Garner.
BY
Edgar Tate & Co.
ATTORNEYS.

UNITED STATES PATENT OFFICE.

JOHN STEPHEN GARNER, OF WASHINGTON, DISTRICT OF COLUMBIA.

LOCK FOR BICYCLES.

SPECIFICATION forming part of Letters Patent No. 601,464, dated March 29, 1898.

Application filed March 12, 1897. Serial No. 627,085. (No model.)

*To all whom it may concern:*

Be it known that I, JOHN STEPHEN GARNER, a citizen of the United States, residing at Washington, in the District of Columbia, have invented certain new and useful Improvements in Locks for Bicycles and Similar Vehicles, of which the following is a full and complete specification, such as will enable those skilled in the art to which it appertains to make and use the same.

This invention relates to locks for bicycles and similar vehicles; and the object thereof is to provide an improved device of this class which is adapted to be connected with one of the forks of the frame in which the wheels are mounted and to operate in connection with the tire of one of the wheels.

The invention is fully disclosed in the following specification, of which the accompanying drawings form a part, in which—

Figure 2:
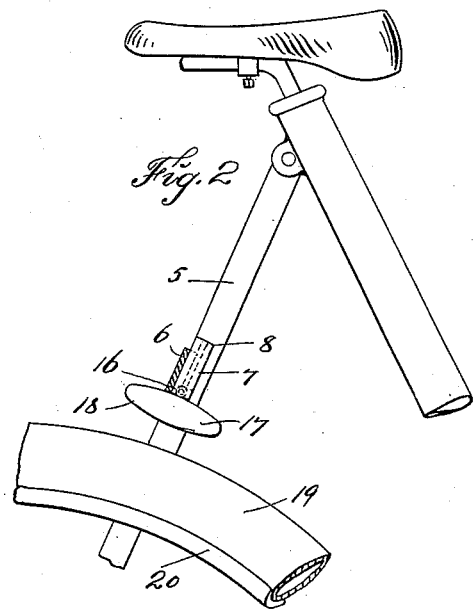
Figure 5:
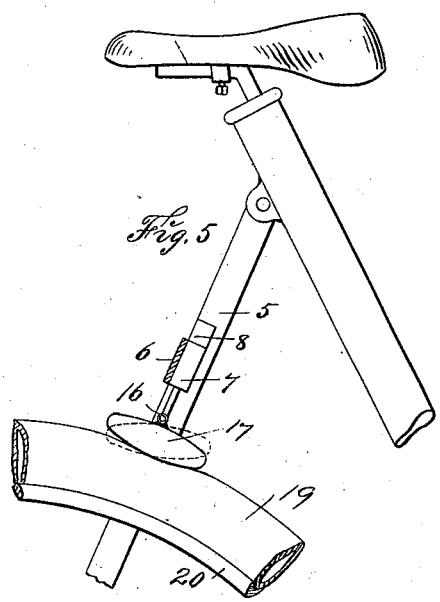
Figure 1:
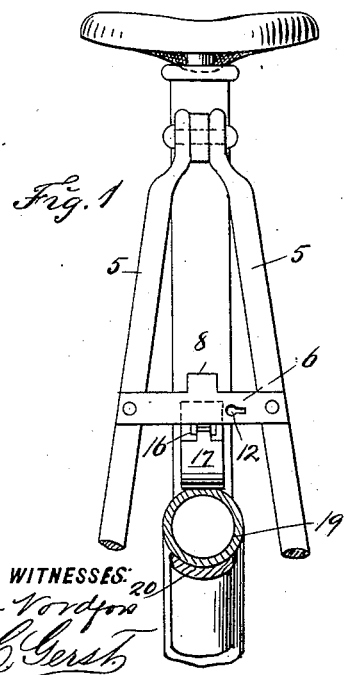
Figure 3:
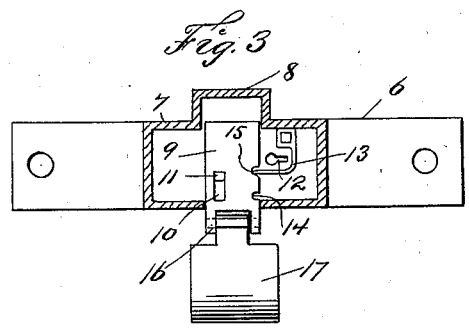
Figure 4:
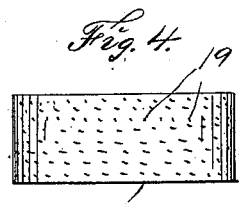

Figure 1 is a rear view of a part of the frame of a bicycle provided with my improvement; Fig. 2, a side view thereof; Fig. 3, a sectional rear view of my improved lock detached from the frame of the vehicle; Fig. 4, a bottom plan view of a part of said lock; and Fig. 5, a view similar to Fig. 2, showing the position of the locking-block when the wheel is locked and showing in dotted lines the position the block assumes when the wheel is started.

In the drawings forming part of this specification the separate parts of my improvement are designated by the same numerals of reference in each of the views, and in said drawings I have shown my improvement applied to an ordinary bicycle and to the rear or drive wheel thereof, and in the practice of my invention I connect with the rods 5, which extend downwardly from the seat-support to the support of the axle of the drive-wheel, a cross-plate 6, which is provided with a lock-casing 7, which is provided with an upwardly-directed extension 8, and mounted in said casing and transversely thereof is a locking-bar 9, which is provided with a slot 10, through which projects a pin 11, and said locking-bar 9 is adapted to be projected into the extension 8 of the lock-casing, and formed in the plate 6, which forms the front of the lock-casing 7, is a keyhole 12, and secured within said casing is a spring 13, which is adapted to be operated by a key and which operates in connection with notches or recesses 14 and 15, formed in the adjacent side of the locking-bar 9.

The locking-bar 9 projects through the lower side of the casing of the lock, and pivotally connected therewith or hinged thereto at 16 is an oblong and elliptical block 17, which may be composed of any desired material, but which is preferably composed of wood, rubber, or similar material and provided with a metal covering or casing 18, and the under side of said block or of the metal covering or casing 18 is provided with numerous points or projections 19, as shown in Fig. 4, and the said locking-bar being so proportioned in length that when retracted the knuckles forming the said pivotal connection between the block 17 and locking-bar 9 are drawn within the said casing, whereby the said block is held firmly against the lower end of said locking-case and is prevented from turning on the said pivotal connection.

In the normal position of the lock the block 17 is suspended as shown in Fig. 2 and the spring 13 engages with the notch or recess 14 in the locking-bar 9, and whenever it is desired to lock the vehicle the key is inserted and the spring 13 operated, so as to disengage the same from the notch or recess 14, at which time the locking-bar drops into the position shown in Fig. 3 and the spring 13 engages with the notch or recess 15. In this position of the locking-bar the block 17 will come in contact with the upper surface of the tire 19 of the drive-wheel, the rim of which is shown at 20, and if an attempt be made to propel the vehicle or turn the drive-wheel forward the locking-block 17 will be thrown into the position shown in dotted lines in Fig. 5 and will press on the tire 19 of the drive-wheel and stop the same. This operation of the block 17 is facilitated by the points or projections 19 on the bottom thereof, which engage with the tire of the drive-wheel, and the pressure of the block 17 on said drive-wheel will be sufficient to accomplish the desired purpose.

The block 17 may be pivotally connected with or hinged to the locking-bar 9 in any desired manner, and it will be apparent that my improved lock may be connected with the front fork and operate in connection with the guide-wheel in the same manner.

My improvement is not limited to the form of the lock nor to the method of operating the locking-bar 9, and it will be apparent that changes in and modifications of the construction herein described may be made without departing from the spirit of my invention or sacrificing its advantages.

Having fully described my invention, I claim as new and desire to secure by Letters Patent—

The herein-described lock for bicycles comprising a lock-operated bolt mounted in the rear fork of the frame, a block or shoe pivotally mounted on the lower end thereof, said block or shoe being oval in form in longitudinal section and the under side thereof being roughened, the said lock-bolt being so proportioned that when held in a down position the under surface of the said block or shoe will press firmly upon the outer surface of the tire, and when retracted the knuckles forming the said pivotal connection between the lock-bolt and block or shoe will be drawn within the lock-casing thereby preventing the turning of said block or shoe, substantially as and for the purpose described.

In testimony that I claim the foregoing as my invention I have signed my name, in presence of the subscribing witnesses, this 8th day of March, 1897.

JOHN STEPHEN GARNER.

Witnesses:
 FRED B. WILLIAMS,
 RUSSELL O. BERNE.